(12) United States Patent
Knotz

(10) Patent No.: US 6,289,055 B1
(45) Date of Patent: Sep. 11, 2001

(54) METHOD FOR TRANSMITTING DIGITAL SIGNALS

(75) Inventor: Herbert Knotz, Erbach (DE)

(73) Assignee: TEMIC Semiconductor GmbH, Heilbronn (DE)

( * ) Notice: Subject to any disclaimer, the term of this patent is extended or adjusted under 35 U.S.C. 154(b) by 0 days.

(21) Appl. No.: 09/285,728

(22) Filed: Apr. 5, 1999

(30) Foreign Application Priority Data

Apr. 3, 1998 (DE) .............................................. 198 15 011

(51) Int. Cl.[7] .............................. H04L 25/34; H04L 25/49
(52) U.S. Cl. ............................. 375/286; 326/60; 370/537
(58) Field of Search ..................................... 375/286, 287, 375/288, 293, 259, 256, 219, 220, 257; 359/112, 181, 182; 370/169, 532, 537–539, 541; 326/59, 60; 327/361

(56) References Cited

U.S. PATENT DOCUMENTS

| | | | |
|---|---|---|---|
| 4,280,221 | * | 7/1981 | Chun et al. ............................ 375/288 |
| 4,339,818 | * | 7/1982 | Gruenberg ............................ 370/269 |
| 5,510,919 | * | 4/1996 | Wedding ............................... 359/112 |

FOREIGN PATENT DOCUMENTS

| | | |
|---|---|---|
| 2330263 | 1/1975 | (DE) . |
| 4035996A1 | 5/1992 | (DE) . |

* cited by examiner

*Primary Examiner*—Chi Pham
*Assistant Examiner*—Jean Corrielus
(74) *Attorney, Agent, or Firm*—Venable; Norman N. Kunitz

(57) ABSTRACT

A signal when transmitting digital transmission signals between a transmitter unit and at least one receiver unit, one signal lead is generally required as a transmission medium for each digital transmission signal. To permit simultaneous transmission of several digital transmission signals through a common signal lead, the digital transmission signals ($S_{11} \ldots S_{10}$) are totaled with several logical signal levels in the transmitter unit (1) to form a multilevel signal (m). This multilevel signal (m) is transmitted from the transmitter unit (1) to the receiver unit (3) through a signal lead (2). For the purpose of forming digital received signals ($S_{31} \ldots S_{3n}$) corresponding to the digital transmission signals ($S_{11} \ldots S_{10}$), the received multilevel signal (m) is compared in the receiver unit (3) with signal thresholds ($V_1 \ldots V_n$) located between the logical signal levels of the multilevel signal (m).

12 Claims, 7 Drawing Sheets

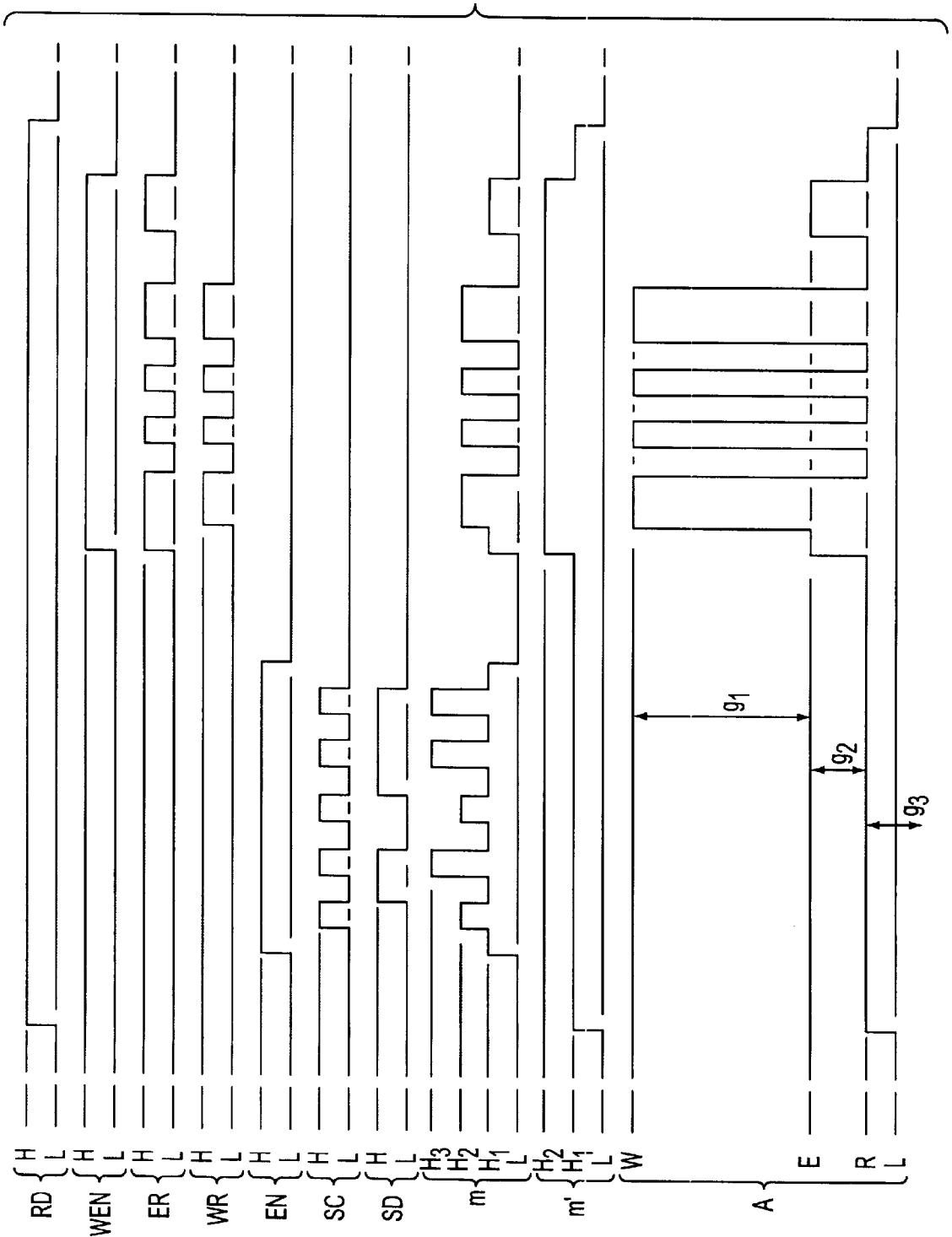

METHOD FOR TRANSMITTING DIGITAL SIGNALS

BACKGROUND OF THE INVENTION

The invention relates to a method for transmission of digital signals between a transmitter unit and at least one receiver unit.

In circuit technology, it is frequently necessary to transmit several digital transmission signals simultaneously from a transmitter unit to a receiver unit. Usually in such a case, one signal lead is needed a transmission medium for each digital transmission signal. In particular, in the case of signal transmission between integrated circuits, this results in expensive wiring and hence leads to high production costs.

SUMMARY OF THE INVENTION

The object of the invention is to provide a method of the type originally mentioned above that can be realized with simple circuit means and which allows transmission of digital signals via a small number of signal leads.

The above object generally is achieve according to the present invention by a method for the transmission of digital transmission signals between a transmitter unit and at least one receiver unit, wherein: in the transmitter unit, at least two digital transmission signals are totaled or combined to form a multilevel signal: the multilevel signal is transmitted through a signal lead from the transmitter unit to the receiver unit; and, in the receiver unit, digital received signals corresponding to the digital transmission signals are from the multilevel signal by amplitude filtering. Advantageous variation and further developments are disclosed.

The essential idea behind the invention is that, from the digital transmission signals to be transmitted, a multilevel signal can be generated with several equidistantly spaced logical signal levels that is transmitted via a signal lead from the transmitter unit to the receiver unit, and is there broken down by amplitude filtration into the digital received signals corresponding to the digital transmission signals. The multilevel signal in the receiver unit is therefore compared With compare thresholds positioned between the possible logical signal levels, the digital received signals being formed as compare result. Owing to the equidistantly spaced signal levels of the multilevel signal, optimal utilization of the dynamic range and a favorable noise behavior is ensured.

In an advantageous development of the method, the digital transmission signals are derived from a clock signal and a serial data signal in synchronism with it, ie. from a signal containing bit information in bit cells in synchronism with the clock signal and, possibly, from a data enable signal that marks the validity of the data signal. Logic operations ensure that, before summation of the digital transmission signals, partial areas of the data signal are blanked out by the clock signal and possibly partial areas of the data enable signal by the clock signal or partial areas of the clock signal by the data enable signal. Consequently, with the exception of one of the transmission signals, each of the remaining transmission signals can assume its active transmission level only when one of the other transmission signals has an active signal level, where each of the transmission signals can have either a high level or a low level as active signal level. If one of the transmission signals is a low-active signal, i.e. has a low level as active signal level, then this transmission signal is added with negative sign to the other transmission signals to form the multilevel signal in the transmitter unit. On the receiving side, the clock signal, the data signal and possibly the data enable signal are regenerated from the digital received signals after the signal transmission. In order to avoid disturbances resulting from the clock signal, the latter is advantageously made available only at the time of data transmission.

A preferred application of the method is the signal transmission through flexible leads between a transmitter unit and receiver unit that can be moved relative to the transmitter unit. An application of this kind is, for example, the control of a laser diode driver in a drive system for rewritable optical storage disks, which driver can be moved over the storage disk. In this application, the data signal, the clock signal and the data enable signal are used to set various parameters of the laser diode driver, e.g. the laser power for various modes of operation, and a write signal, a read signal and an erase signal for controlling the laser power in the various modes of operation, in particular in the "write", "Read" and "Delete" modes. On the receiver side, received signals are formed corresponding to the write, read and erase signals, weighted in each case with a weighting factor and totaled after weighting into a control signal for a laser diode. The method thus allows both transmission of amplitude information, i.e., the laser power for the various modes of operation, and the transmission of any desired time information contained in the pulse widths of the write, read or erase signal.

Advantageously, a multilevel signal is made up of the write signal, the erase signal and the read signal, or two multilevel signals are made up of the write signal, the read signal, the erase signal, the clock signal, the data signal and the data enable signal, where these two signals are transmitted through two signal leads from a control unit, i.e., from the transmitter unit, to the laser diode driver, i.e., to the receiver unit. Preferably, transmission takes place in amplitude and time multiplex, i.e., in a first time window the clock signal, the data signal and the data enable signal are grouped together and transmitted simultaneously in a multilevel signal. In a subsequent time window, the write and erase signal are also transmitted simultaneously through the same signal lead grouped together. Furthermore, the read signal and the write enable signal are in turn transmitted simultaneously and grouped together in another multilevel signal preferably through another signal lead, with the write enable signal marking the time window by transmitting the write and erase signal at the same time to the receiver unit through the other signal lead.

BRIEF DESCRIPTION OF THE DRAWINGS

FIG. 11 shows voltage/time diagrams for various signals from the circuit arrangement shown in FIG. 10

DETAILED DESCRIPTION OF THE PREFERRED EMBODIMENTS

The invention will now be described in more detail on the basis of embodiment examples with reference to the Figures.

Figure 1:
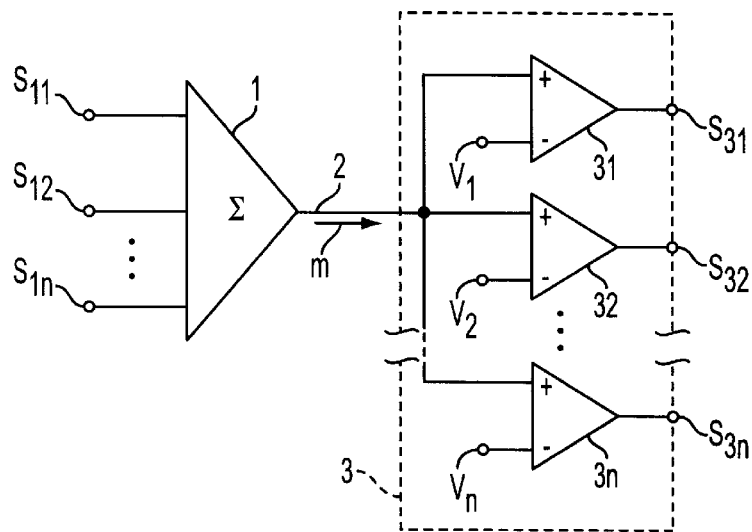
FIG. 1 is a circuit diagram of a first circuit arrangement for performing the method in accordance with the invention.

As can be seen in FIG. 1, the digital transmission signals $s_{11}, s_{12} \ldots s_{1n}$ are totaled in the transmitter unit 1 to form the multilevel signal m which is transmitted from the transmitter unit 1 to the receiver unit 3 through signal lead 2. Signal lead 2 can be of symmetrical design, i.e., it can have two wires for differential signal transmission, or of asymmetrical design, i.e., one wire as supply line and one wire as reference line for a reference potential, such as a ground or supply potential, for example. In the present example, it is of flexible design; furthermore, the transmitter unit 1 and the receiver unit 3 are integrated on different semiconductor chips and can be moved relative to each other. For amplitude filtering in the receiver unit 3, one comparator 31, 32, ... 3n is provided for each of the digital transmission signals $s_{11}, s_{12} \ldots s_{1n}$ respectively to compare the multilevel signal m with in each case one signal threshold $V_1, V_2, \ldots V_n$ respectively between two adjacent logical signal levels of the multilevel signal m, and to supply as comparison result the digital received signal $s_{31}, s_{32}, \ldots s_{3n}$ corresponding to the respective digital transmission signal $s_{11}, s_{12}, \ldots s_{1n}$. The gaps between the logical signal levels of the multilevel signal m are substantially equal so that optimum utilization of the dynamic range is ensured.

Figure 2:
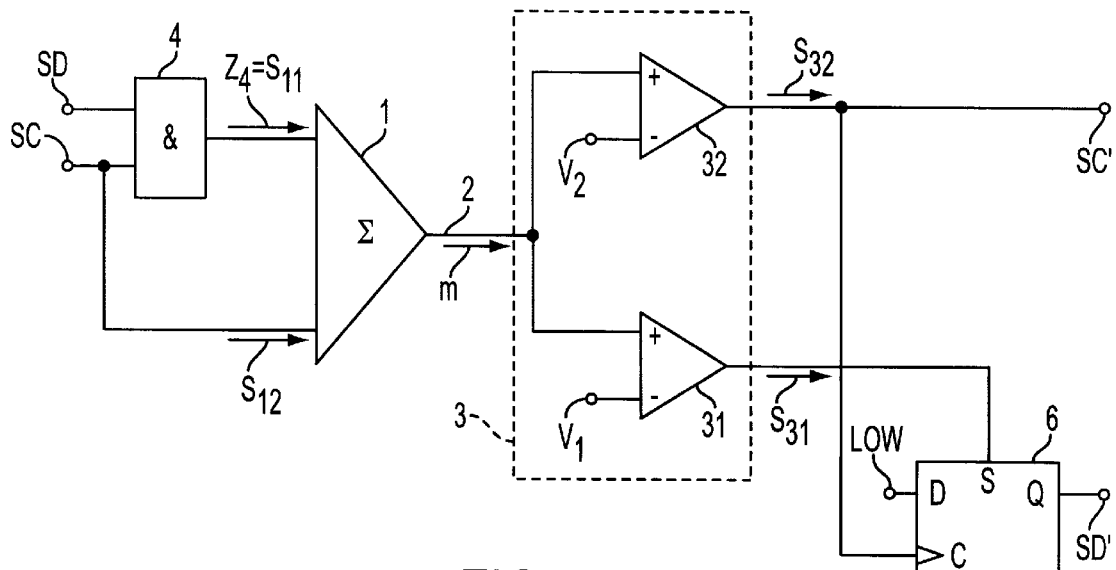
FIG. 2 is a circuit diagram of a second circuit arrangement for performing the method in accordance with the invention.
Figure 3:
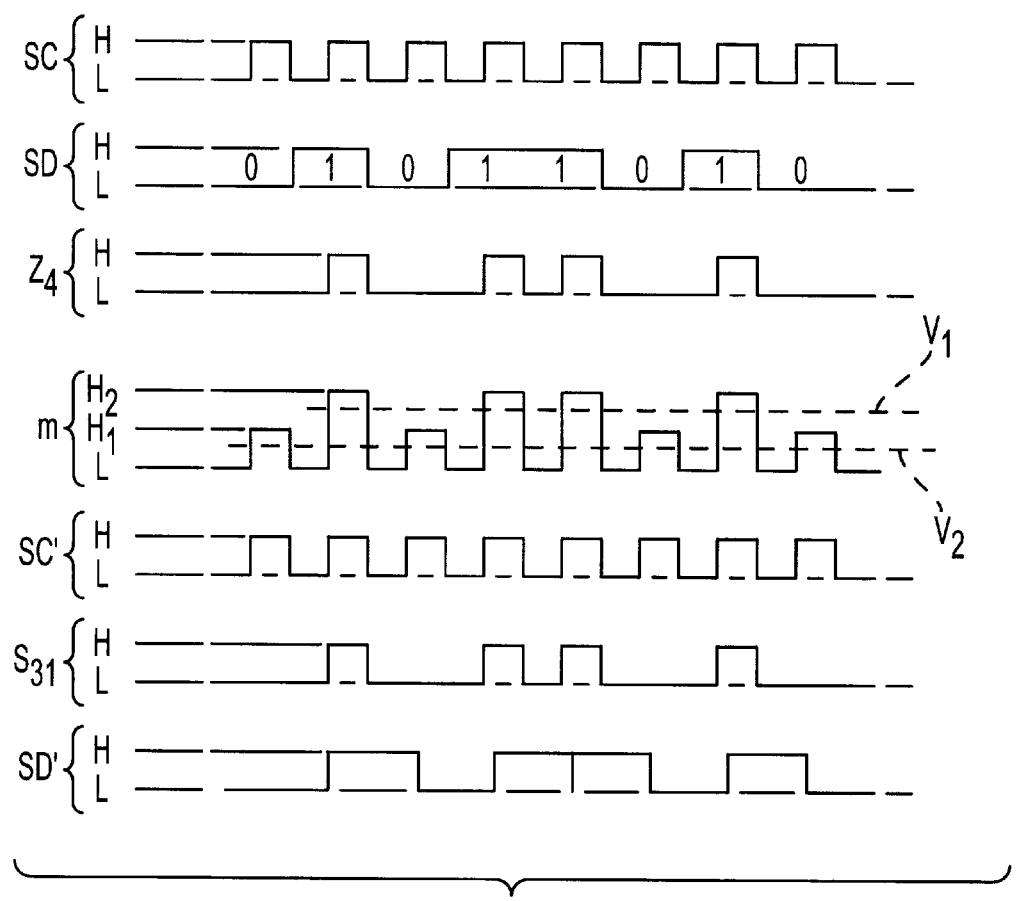
FIG. 3 shows voltage/time diagrams for various signals from the circuit arrangement shown in FIG. 2.

In accordance with FIG. 2, for the transmission of serial digital data a clock signal SC and a serial data signal SD in synchronism with it and containing the data as information are linked through an AND gate 4 to form an intermediate signal $z_4$ which is supplied to the transmitter unit 1 as the first transmission signal $s_{11}$. The clock signal SC is supplied to the transmitter unit 1 as the second transmission signal $s_{12}$. FIG. 3 shows that by performing the AND operation on the data signal SD and the clock signal SC, one half of the areas of the data signal SD having a high level H is blanked out by the clock signal SC and that the bit information of the data signal SD is retained in the intermediate signal $z_4$ so that the first digital transmission signal $s_{11}$ can assume a high level only when the second digital transmission signal $s_{12}$ has a high level H. The intermediate signal $z_4$ and the clock signal SC (the latter being supplied to the transmitter unit 1 as the second digital transmission signal $s_{12}$) are totaled in the transmitter unit 1 to form the multilevel signal m which has three logical signal levels designated L, $H_1$ and $H_2$. The multilevel signal m is transmitted through the signal lead 2 to the receiver unit 3 where It is compared in the first comparator 31 with the first signal threshold $V_1$ above the middle logical signal level $H_1$, and in the second comparator 32 With the second signal threshold $V_2$ below the middle logical signal level $H_1$. As the result of comparison, the first comparator 31 supplies the first digital received signal $s_{31}$ corresponding to the first digital transmission signal $s_{11}$ and the second comparator 32 supplies the regenerated clock signal SC', i.e., the second digital received signal $s_{32}$ corresponding to the second digital transmission signal $s_{12}$ and equal to the clock signal SC. The data signal SD is regenerated on the receiving side with the D flip-flop 6 whose D input is permanently at low level The flip-flop 6 is set to a high level of the first digital received signal $s_{31}$ and one clock period later it is reset under edge control with the rising edge of the second digital received signal $s_{32}$ so that the regenerated data signal SD' is sent out from its output Q.

Figure 4:
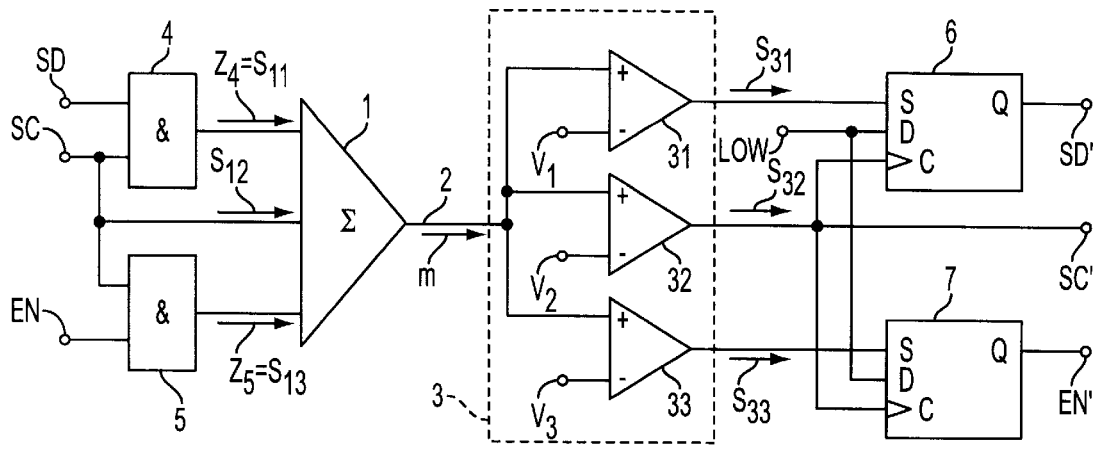
FIG. 4 is a circuit diagram of a third circuit arrangement for performing the method in accordance with the invention.
Figure 5:
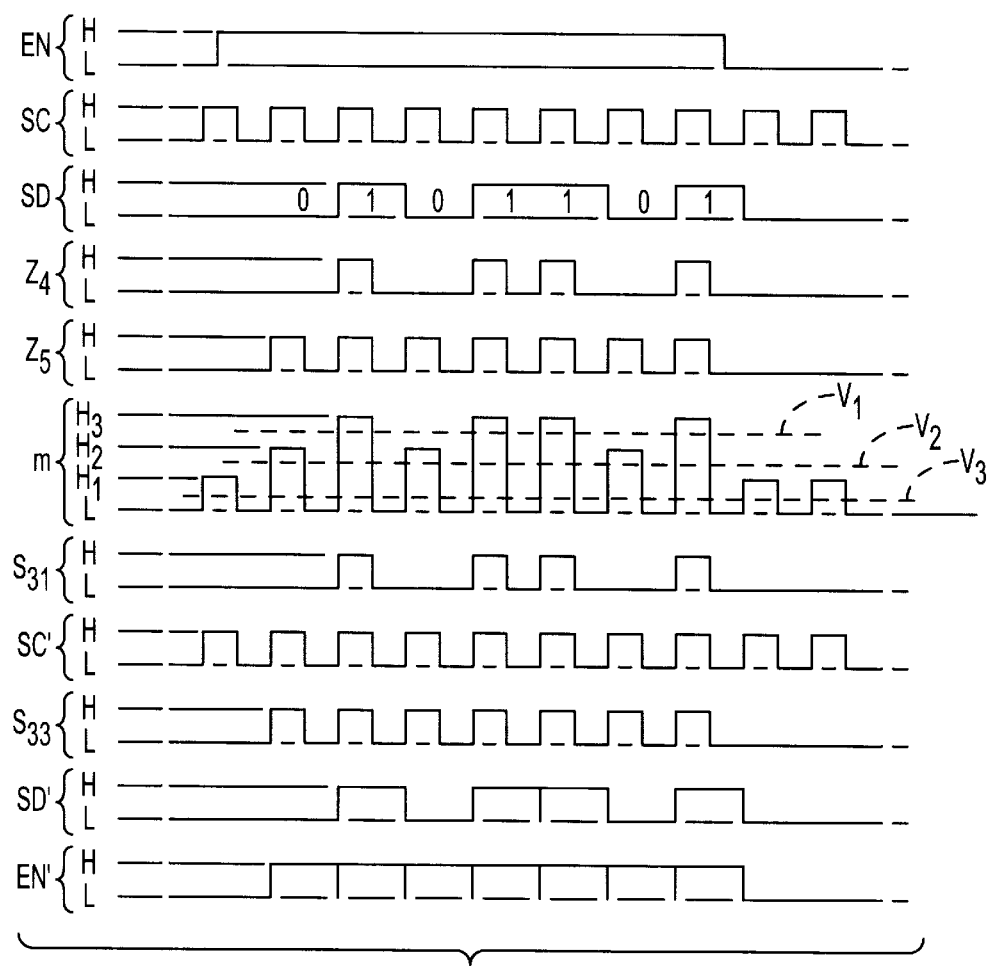
FIG. 5 shows voltage/time diagrams for various signals from the circuit arrangement shown in FIG. 4.

A further AND gate 5, a further flip-flop 7 and a third comparator 33 can be added to the circuit arrangement of FIG. 2 to make the circuit arrangement shown in FIG. 4. in this circuit arrangement, another data enable signal EN is used in addition to the clock signal SC and data signal SD in order to form the multilevel signal m, and at the same time the data enable signal EN is used to mark the validity of the data signal SD and to activate data transmission. The clock signal SC is transmitted permanently here. With the other AND gate 5, the data enable signal EN and the clock signal SC are linked to form a further intermediate signal $z_5$ which is supplied to the transmitter unit 1 as a third digital transmission signal $s_{13}$. As shown in FIG. 5, those partial areas of the data signal SD and the data enable signal EN are blanked out by the clock signal SC that have a high level H at a low level L of the clock signal SC. The third transmission signal $s_{13}$ can therefore assume a high level only when the second digital transmission signal $s_{12}$ has a high level. The multilevel signal m formed by totaling or combining the three digital transmission signals $s_{11}, s_{12}, s_{13}$, has four logical signal levels, namely L, $H_1$, $H_2$ and $H_3$. In the receiver unit 3, the multilevel signal m is supplied to the three comparators 31, 32, 33. The first comparator 31 compares the multilevel signal m with the compare threshold $V_1$ positioned between the two highest logical signal levels $H_3$ and $H_2$ of the multilevel signal m and supplies as the result of comparison the first digital received signal $s_{31}$ corresponding to the first digital transmission signal $s_{11}$ and containing the bit information Of the data signal SD; the second comparator 32 compares the multilevel signal m with the compare threshold $V_2$ positioned between the two lowest logical signal levels L and $H_2$ of the multilevel signal m and supplies as the result of comparison SC' the second digital received signal $s_{32}$ corresponding to the second digital transmission signal $s_{12}$ and equal to the clock signal SC; finally, the third comparator 33 compares the multilevel signal m with the compare threshold $V_3$ positioned between the two middle logical signal levels $H_1$ and $H_2$ of the multilevel signal m and supplies as the result of comparison the third digital received signal $s_{33}$ corresponding to the third digital transmission signal $s_{13}$. As in the circuit arrangement given in FIG. 2, the data signal SD is regenerated with flip-flop 6 which is set with the high level H of the first digital received signal $s_{31}$, i.e., it is level controlled, and one clock period later it is reset with the rising edge of the second digital received signal $s_{32}$. The data enable signal EN is similarly regenerated with the other flip-flop 7 which is set with the high level H of the third digital received signal $s_{33}$ and reset one clock period later with the rising edge of the second digital received signal $s_{32}$ under edge control. The regenerated data signal DS' and the regenerated data enable signal EN' can be further processed with the D flip-flops not shown in the Figure, and which are clock-pulset in counterphase to the flip-flops 6 and 7, in order to suppress signal peaks that can arise as a result of runtime differences.

Figure 6:
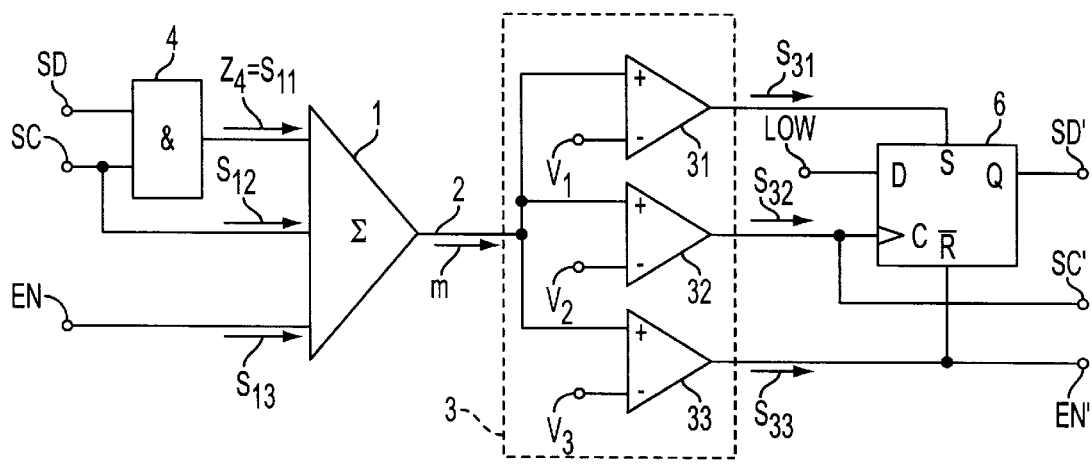
FIG. 6 is a circuit diagram of a fourth circuit arrangement for performing the method in accordance with the invention.
Figure 7:
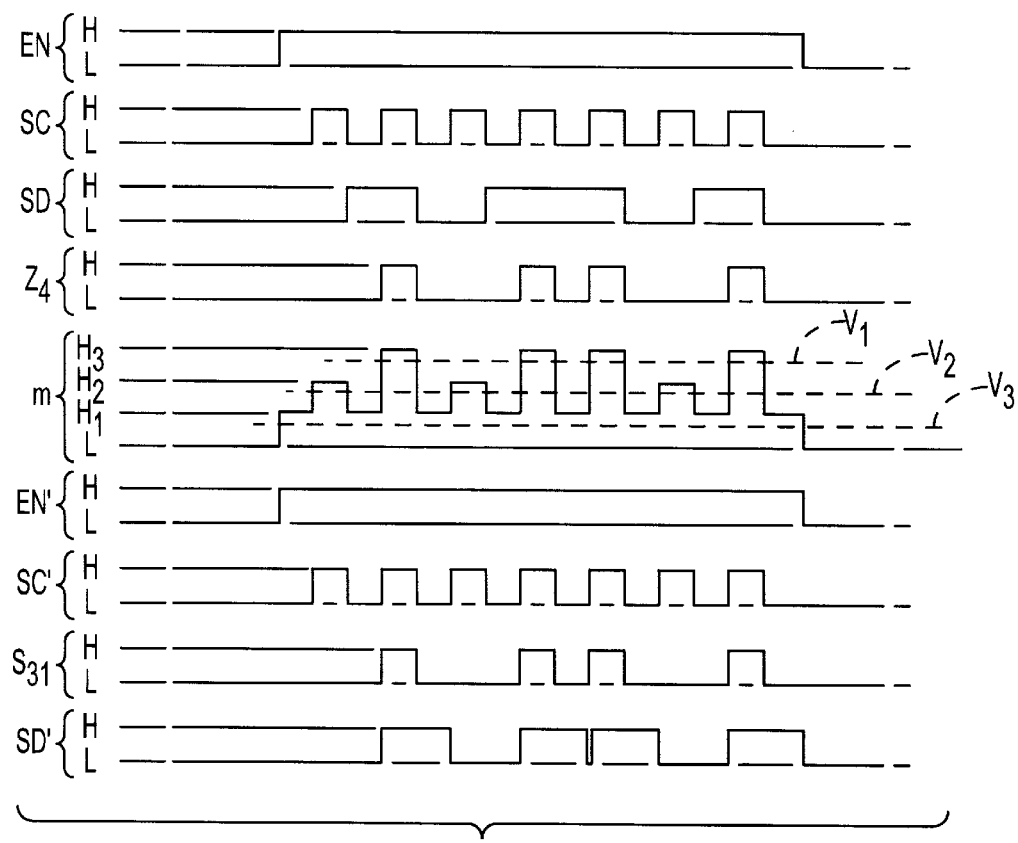
FIG. 7 shows voltage/time diagrams for various signals from the circuit arrangement shown in FIG. 6.

FIG. 6 shows a further development of the circuit arrangement given in FIG. 2. It differs from the circuit arrangement given in FIG. 2 in that, in addition to the first digital transmission signal $s_{11}$ which is equal to the intermediate signal $z_4$ and in addition to the second digital transmission signal $s_{12}$ which is equal to the clock signal SC, a third digital transmission signal $s_{13}$ is supplied to the transmitter unit 1 that is equal to the data enable signal EN with which the validity of the data signal SD is marked, and in that the data enable signal EN is regenerated in the receiver unit 3 with a third comparator 33. As shown in FIG. 7, the clock signal SC is provided only at the time of data transmission. Disturbances resulting from the clock signal SC are therefore avoided to a large extent. The data signal SD and the clock signal SC have a high level only at a high level H of the data enable signal EN. This can be achieved if necessary by signal preprocessing in which the data signal SD and the clock signal SC are each AND-gated with the data enable signal EN. With the AND gate 4, which links the data signal SD and the clock signal SC to form the intermediate signal $z_4$, it is ensured that the first digital transmission signal $s_{11}$ equal to the intermediate signal $z_4$ can assume a high level only when the clock signal SC is at a high level. In the transmitter unit 1, the digital transmission signals $s_{11}$, $s_{12}$, $s_{13}$ are totaled to form the multilevel signal m with the four logical signal levels L, $H_1$, $H_2$ and $H_3$. In the receiver unit 3, the multilevel signal m is supplied to the three comparators 31, 32, 33. The first comparator 31 compares the multilevel signal m with the compare threshold $V_1$ positioned between the two highest logical signal levels $H_3$ and $H_2$ of the multilevel signal m and supplies as the result of comparison the first digital received signal $s_{31}$ corresponding to the first digital transmission signal $s_{11}$ and containing the bit information of the data signal SD; the second comparator 32 compares the multilevel signal m with the compare threshold $V_2$ positioned between the two middle logical signal levels $H_1$ and $H_2$ of the multilevel signal m and supplies as the result of the comparison SC' the second digital received signal $s_{32}$ corresponding to the second digital transmission signal $s_{12}$ and equal to the clock signal SC; and finally the third comparator 33 compares the multilevel signal m with the compare threshold $V_3$ positioned between the two lowest logical signal levels L and $H_1$ of the multilevel signal m and supplies as the result of comparison EN' the third digital received signal $s_{33}$ corresponding to the third digital transmission signal $s_{13}$ and equal to the data enable signal EN. As in the circuit arrangement of FIG. 2, the data signal SD is regenerated with the flip-flop 6 which is set with the high level H of the first digital received signal $s_{31}$ and reset one clock cycle later with the rising edge of the second digital received signal $s_{32}$ under edge control. The flip-flop 6 is also reset independently of the clock pulse by the low level L of the third digital received signal $s_{33}$.

Figure 8:
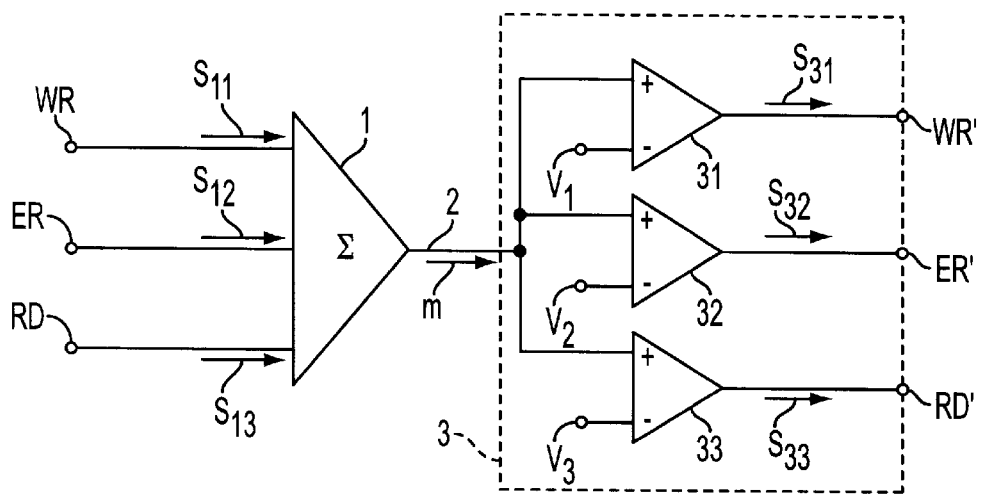
FIG. 8 is a circuit diagram of a fifth circuit arrangement for performing the method in accordance with the invention.
Figure 9:
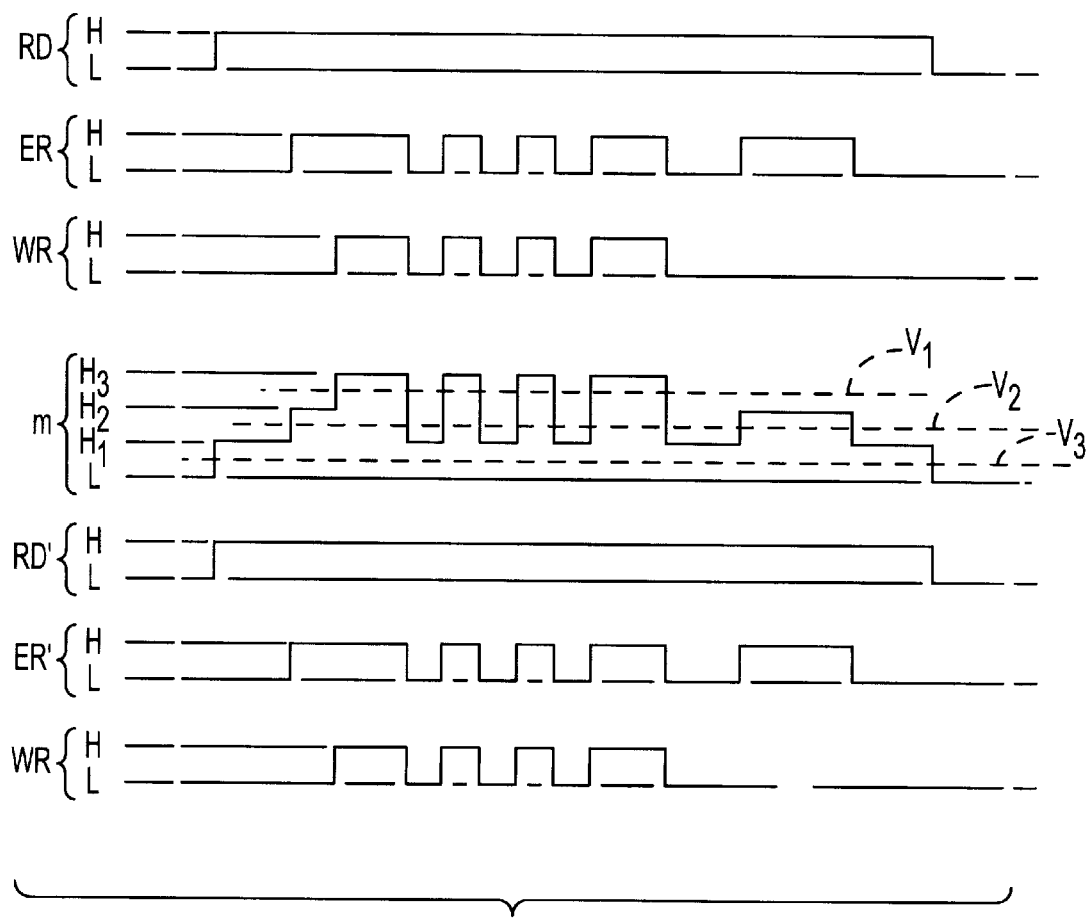
FIG. 9 shows voltage/time diagrams for various signals from the circuit arrangement shown in FIG. 8.

The circuit arrangement shown in FIG. 8 is used in a drive for storage media, in particular for rewritable optical disks, for the transmission of a write signal WR, an erase signal ER and a read signal RD from the transmitter unit 1 via the signal lead 2 to the receiver unit 3. With the write signal WR that is supplied as, first digital transmission signal $s_{11}$ to the transmitter unit 1, the writing of markings representing data on the storage medium is thus controlled, with the erase signal ER that is supplied as a second digital transmission signal $s_{12}$ to the transmitter unit 1, the erasure of markings from the storage medium is controlled, and with the read signal RD that is supplied as third, a digital transmission signal $s_{13}$ to the transmitter unit 1, the reading of markings from the storage medium is controlled. Erasure is understood here to mean the writing of a specified bit value, for instance the marking corresponding to bit value 0. In a drive for rewritable optical storage disks, for so-called DVD-RAMS for example, the transmitter unit 1 is part of a control unit controlling the drive and the receiver unit 3 is part of a laser diode driver, not shown in the Figures, that is fitted to a write/erase/read head that can move over the storage disk and with which the optical performance of a laser diode is controlled in accordance with the desired action (write, erase or read). In accordance with FIG. 9, the write signal WR has a high level H only when the erase signal ER is active, i.e. when the erase signal ER has a high level H. Furthermore, the erase signal ER has a high level only when the read signal RD has a high level. For transmission of the read signal RD, the erase signal ER and the write signal WR, these are totaled in the transmitter unit 1 to form the multilevel signal m with the logical signal levels L, $H_1$, $H_2$ and $H_3$. The multilevel signal m is then transmitted through the signal lead 2 to the receiver unit 3 where it is broken down by amplitude filtering with the comparators 31, 32, 33 into the digital received signals $s_{31}$, $s_{32}$, $s_{33}$. For this purpose, the first comparator 31 compares the multilevel signal m with compare threshold $V_1$ positioned between the two highest logical signal levels $H_3$ and $H_2$ of the multilevel signal m and supplies as the result of comparison WR' the first digital received signal $s_{31}$ corresponding to the first digital transmission signal $s_{11}$ and equal to the write signal WR; the second comparator 32 compares the multilevel signal m with the compare threshold $V_2$ positioned between the two middle logical signal levels $H_1$ and $H_2$ of the multilevel signal m and supplies as the result of comparison ER' the second digital received signal $s_{32}$ corresponding to the second digital transmission signal $s_{12}$ and equal to the erase signal ER; and finally the third comparator 33 compares the multilevel signal m with the compare threshold $V_3$ positioned between the two lowest logical signal levels L and $H_1$ of the multilevel signal m and supplies as the result of comparison RD' the third digital received signal $s_{33}$ corresponding to the third digital transmission signal $s_{13}$ and equal to the read signal RD.

Figure 10:
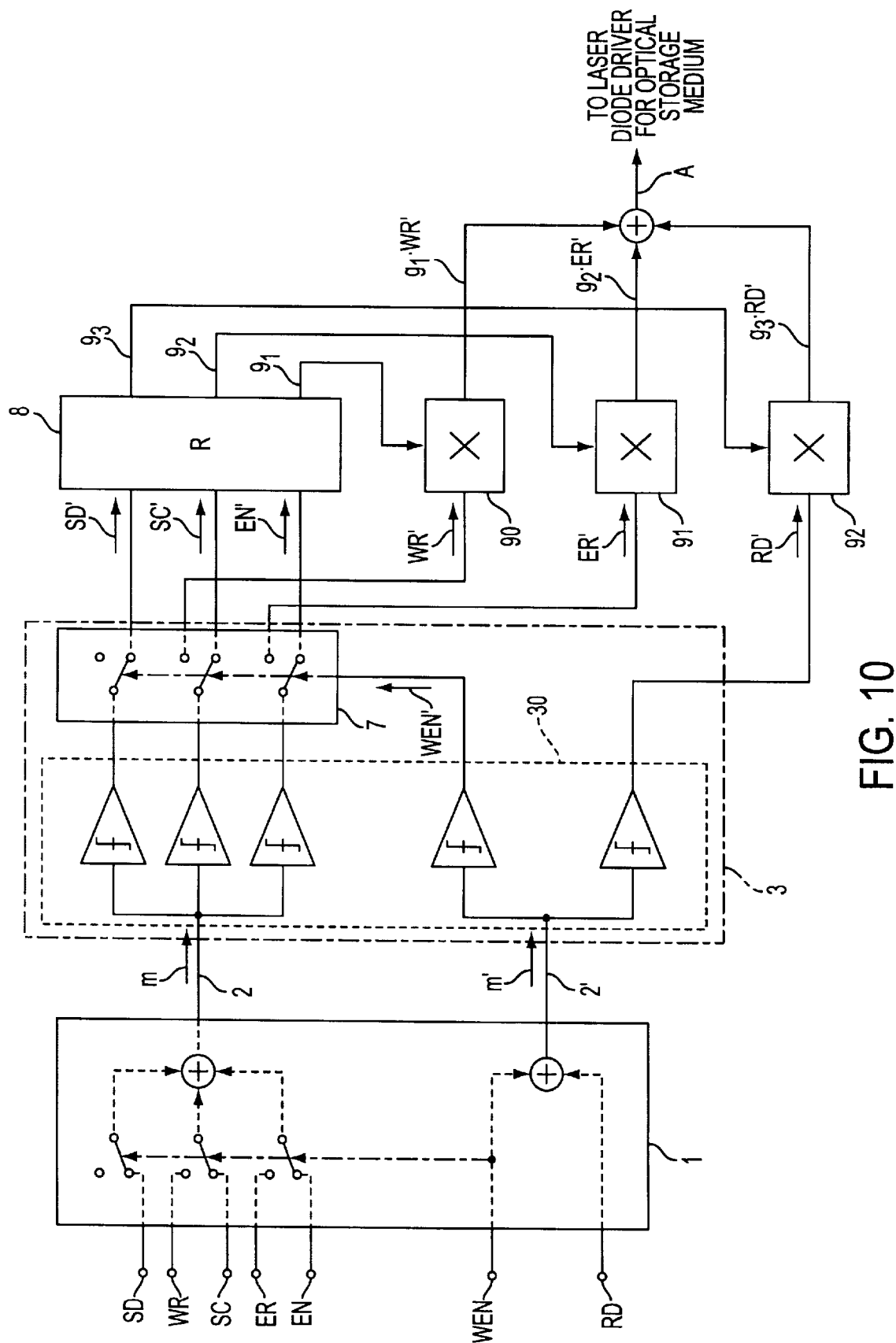
FIG. 10 is a basic circuit diagram of a sixth circuit arrangement for performing the method in accordance with the invention.

The circuit arrangement given in FIG. 10 shows a development of the circuit arrangement given in FIG. 8, where the write signal WR, the erase signal ER, a write enable signal WEN, which marks a time window in which the write signal WR and erase signal ER are transmitted, and in which the read signal RD as well as the clock signal SC, the serial data signal SD whose bit information is contained in the bit cells that are in synchronism with the clock signal SC, and the data enable signal EN with which the validity of the data signal SD is marked are supplied to the transmitter unit 1 as digital transmission signals, and in which the transmitter unit 1 generates two multilevel signals m, m' which are transmitted each through one of the signal leads 2, 2' to the receiver unit 3. The receiver unit 3 thereupon forms from the two multilevel signals m, m' the digital received signals WR', ER', WEN', SD', Sc', EN', RD', which correspond to the digital transmission signals WR, ER, WEN, SD, SC, EN, RD. in accordance with FIG. 11, the read signal RD has a high level during the entire signal transmission and the write enable signal WEN has a high level during transmission of the write signal WR and the erase signal ER. In the transmitter unit 1, the clock signal SC, the data signal SD and the data enable signal EN are grouped together to form the multilevel signal m in one time window and the write signal WR and erase signal ER are grouped together to form the multilevel signal m in a subsequent time window so that the multilevel signal m, which is transmitted through the signal lead 2 to the receiver unit 3, has four logical signal levels L, $H_1$, $H_2$ and $H_3$. The other multilevel signal m', which is generated by totaling the read signal RD and the write enable signal WEN and transmitted to the receiver unit 3 through the other signal lead 2', has three logical signal levels L, $H_1$ and $H_2$. The multilevel signal m' can be realized as active high (as shown in FIG. 11) or active low. In order to keep the pulse distortions in the multilevel signal m as small as possible, the signal lead 2 is of symmetrical design while the other signal lead 2' is of the single wire type because of the non-critical time requirements with respect to the other multilevel signal m' or to the read signal RD and write enable signal WEN.

On the basis of the write enable signal WEN' regenerated by amplitude filtering from the other multilevel signal m', the time window is identified in the receiver unit 3 in which the multilevel signal m contains the information of the data signal SD, the data enable signal EN and of the clock signal SC or of the write signal WR and of the erase signal ER so that the signal components corresponding to the write signal WR, the erase signal ER, the data signal SD, the data enable signal EN and the clock signal SC are unambiguously identified from the multilevel signal m. The received signals WR', ER', SD', EN', and SC' which are the same as the write signal WR, erase signal ER, data signal SD, data enable signal EN and clock signal SC respectively are then regenerated from these signal components. The data signal SD, data enable signal EN and clock signal SC are transmitted here in accordance with the embodiment example given in FIG. 6, although transmission in accordance with the embodiment example given in FIG. 4 is also conceivably possible.

On the receiving side, received signals SD', EN', SC' are formed from the multilevel signal m corresponding to the data signal SD, data enable signal EN and clock signal SC by means of an amplitude filter 30 with several comparators and by means of a decoding stage 7. These received signals are supplied to a register (R) in order to temporarily store the bit information of the data signal SD, i.e., the transmitted serial digital data. This data represents weighting factors $g_1$, $g_2$, $g_3$ with which the received signals ER', WR', RD' in the weighting steps 90, 91, 92 are weighted, i.e., multiplied, to form the weighted received signals $g_1$-WR', $g_2$-ER', $g_3$-RD'. The weighted received signals $g_1$-WR', $g_2$-ER', $g_3$-RD' are then totaled to form the control signal A with which the laser diode (not shown in the Figure) of the drive for optical storage media is driven.

The control signal A has several signal levels L, R, E, W, whose spacing is preset by the weighting factors $g_1$, $g_2$, $g_3$. Thus, both amplitude information and time information are transmitted through signal lead 2. The amplitude information is transmitted here as serial digital data and the time information as pulse widths of the write signal WR, read signal RD or erase signal ER; these pulse widths are not sampled on the receiving side and can therefore have any values, i.e., they are suitable for the transmission of analog information, to the receiver unit.

What is claimed is:

1. A method for the transmission of digital transmission signal between a transmitter unit (1) and at least one receiver unit (3), comprising: in the transmitter unit (1), combining at least two digital transmission signal ($s_{11}, s_{12} \ldots s_{1n}$) to form a multilevel signal (m); transmitting the multilevel signal (m) through a signal lead (2) from the transmitter unit (1) to the receiver unit (3); in the receiver unit (3), forming digital received signals ($s_{31}, s_{32} \ldots s_{3n}$) corresponding to the digital transmission signals ($s_{11}, s_{12} \ldots s_{1n}$) by amplitude filtering from the multilevel signal (m); and wherein an intermediate signal ($z_4$) formed by AND-gating a clock signal (SC) and serial data signal (SD) that is in synchronism with the clock signal (SC), is supplied to the transmitter unite (1) as a first digital transmission signal ($s_{11}$) and the clock signal (SC) is supplied as a second digital transmission signal ($s_{12}$).

2. The method in accordance with claim 1, wherein on the receiving side the data signal (SD) is regenerated with a flip-flop (6) which is set with the digital received signal ($s_{31}$) corresponding to the first digital transmission signal ($s_{11}$) and is reset under edge control with the digital received signal ($s_{32}$) corresponding to the second digital transmission signal ($s_{12}$).

3. The method in accordance with claim 1, wherein a data enable signal (EN) that marks the validity of the data signal (SD) is transmitted to the transmitter unit (1) as a third digital transmission signal ($s_{13}$).

4. The method in accordance with claim 3, wherein on the receiving side the data signal (SD) is regenerated with a flip-flop (6) which is set with the digital received signal ($s_{31}$) corresponding to the first digital transmission signal ($s_{11}$), and which is reset under edge control ith the digital received signal ($s_{32}$) corresponding to the second digital transmission signal ($s_{12}$), and which is reset under the level control with the digital received signal ($s_{33}$) corresponding to the third digital transmission signal ($s_{13}$).

5. The method in accordance with claim 1, wherein another intermediate signal ($z_5$) formed by AND-gating the clock signal (SC) and a data enable signal (EN) is transmitted to the transmitter unit (2) as third digital transmission signal ($s_{13}$).

6. The method in accordance with claim 5, wherein on the receiving side the data signal (SD) is regenerated with a flip-flop (6) which is set with the digital received signal ($s_{31}$) corresponding to the first digital transmission signal ($s_{11}$) and is reset under edge control with the digital received signal ($s_{32}$) corresponding to the second digital transmission signal ($s_{12}$), and wherein on the receiving side the data enable signal (EN) is regenerated with another flip-flop (7) which is set with the digital received signal ($s_{33}$) corresponding to the third digital transmission signal ($s_{13}$) and reset under edge control with the digital received signal ($s_{32}$) corresponding to the second digital transmission signal ($s_{12}$).

7. The method in accordance with claim 1 wherein transmitter unit (1) transmits the serial digital data to the receiver unit (3).

8. A method for generating a control signal (A) having at least three signal levels (L, R, E, W) for driving a laser diode for an optical storage media comprising for each signal level (R, E, W) differing from the base level (L) of the control signal (A), forming a digital transmission signal (RD, ER, WR) corresponding to this signal level (R, E, W), combining the transmission signals (RD, ER, WR) in a transmitter unit (1) to form a multilevel signal (m) or several multilevel signals (m, m'), transmitting each multilevel signal (m, m') to a receiver unit (3) through a signal lead (2, 2'), forming received signals (RD', ER', WR') corresponding to the transmission signals (RD, ER, WR) in the receiver unit (3) by amplitude filtering from the multilevel signal (m) or multilevel signals (m, m'), weighting the received signals (RD', ER', WR') each with a weighting factor (g1, g2, g3) and combining the weighted received signals $g_1$, WR', $g_2$ ER', $g_3$ RD') to form the control signal (A).

9. The method in accordance with claim 8, wherein the digital transmission signals (RD, ER, WR) and serial digital data are transmitted in time-multiplex mode from the transmitter unit (1) to the receiver unit (3).

10. The method in accordance with claim 8, wherein the pulse widths of the digital transmission signals (RD, ER, WR) have any values.

11. The method in accordance with claim 9, wherein the weighting factors ($g_1, g_2, g_3$) are preset by the serial digital data.

12. The method in accordance with claim 9, wherein for the transmission of the serial digital data a clock, signal (SC), a serial data signal (SD) in synchronism with the clock signal (SC), and a data enable signal (EN) that marks the validity of the data signal (SD) are grouped together in a data transmission time window to form the multilevel signal (m).

* * * * *